(12) United States Patent
Meixner

(10) Patent No.: US 8,407,513 B2
(45) Date of Patent: Mar. 26, 2013

(54) CLOCK DISTRIBUTION WITH FORWARD FREQUENCY ERROR INFORMATION

(75) Inventor: Michael Meixner, Munich (DE)

(73) Assignee: Infineon Technologies AG, Neubiberg (DE)

( * ) Notice: Subject to any disclaimer, the term of this patent is extended or adjusted under 35 U.S.C. 154(b) by 717 days.

(21) Appl. No.: 12/425,251

(22) Filed: Apr. 16, 2009

(65) Prior Publication Data
US 2010/0268976 A1  Oct. 21, 2010

(51) Int. Cl.
*G06F 1/12* (2006.01)
(52) U.S. Cl. ..... 713/503; 713/400; 375/371; 455/67.11; 455/68; 455/436

(58) Field of Classification Search ............ 713/400, 713/503; 375/371; 455/67.11, 68, 436
See application file for complete search history.

(56) References Cited

U.S. PATENT DOCUMENTS

| | | | | |
|---|---|---|---|---|
| 6,032,033 A | * | 2/2000 | Morris et al. | 455/277.2 |
| 7,424,076 B2 | * | 9/2008 | Scheffel | 375/356 |
| 2007/0058683 A1 | * | 3/2007 | Futami et al. | 370/516 |
| 2008/0043672 A1 | * | 2/2008 | Sebire et al. | 370/331 |
| 2009/0209251 A1 | | 8/2009 | Meixner | |

* cited by examiner

*Primary Examiner* — Thuan Du
(74) *Attorney, Agent, or Firm* — SpryIP, LLC

(57) ABSTRACT

This disclosure relates to providing an information signal to one or more sub-systems within a wireless communications device, where the information signal enables the sub-systems to operate based on virtually corrected reference frequency clock signal(s).

18 Claims, 4 Drawing Sheets

400

TRANSMITTING, FROM A MASTER DEVICE TO AT LEAST ONE SUB-SYSTEM, A REFERENCE FREQUENCY SIGNAL AND A INFORMATION SIGNAL
402

READING, IN THE SUB-SYSTEM, THE INFORMATION SIGNAL WITH EVERY RISING AND FALLING EDGE OF THE REFERENCE FREQUENCY SIGNAL
404

CLOCK DISTRIBUTION WITH FORWARD FREQUENCY ERROR INFORMATION

BACKGROUND

Wireless communication networks are comprised of numerous base stations at fixed locations placed throughout a region. The wireless network provides communication between the base stations and wireless communication devices located within that region. The wireless communication connection between a base station and a wireless communication device includes a radio signal. A reference frequency clock signal is derived from the radio signal and is used to coordinate communication between the base station and the wireless communication device. As indicated by their name, wireless communication devices are capable of moving within a wireless communication network. As a result of this movement, the reference frequency clock signal is subjected to the Doppler effect resulting in deviations in the reference frequency. This problem is compounded when the wireless device is transferred from base station to base station, which is commonly known as handover, as each base station has got a certain tolerance relative to an absolutely ideal reference frequency. Additional deviations from the absolute reference frequency signal can be introduced by poor or missing handover attempts.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
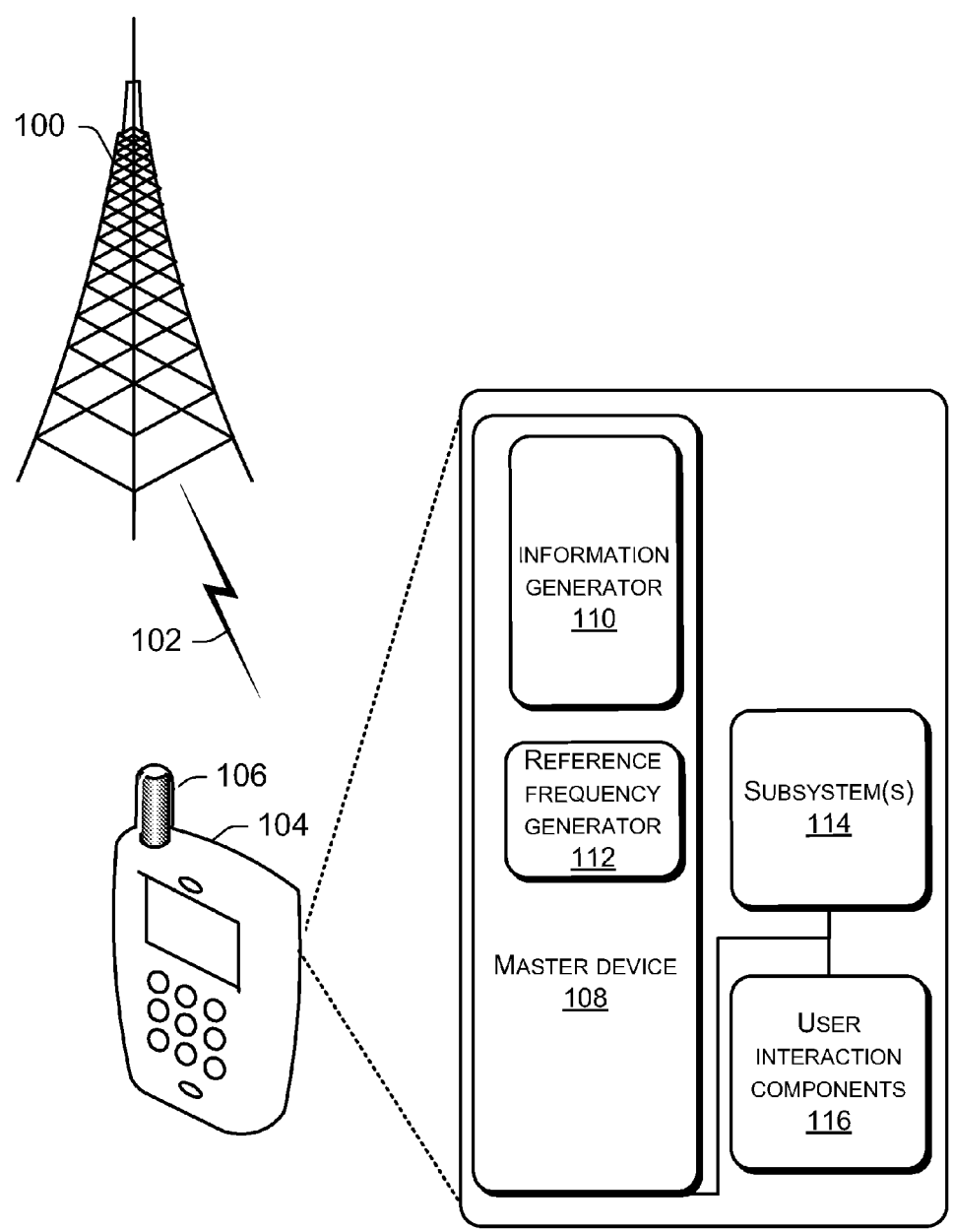
FIG. 1 is an example of a wireless communications network with a base station and a wireless communications device.

Disclosed herein are techniques providing corrective information related to a reference frequency based on a plurality of information sources available to a wireless communications device. In one embodiment, a wireless communications device contains a master device and at least one sub-system. The master device is configured to generate a reference frequency signal from a radio signal within a wireless communications network. The master device contains a reference frequency generator and an information generator. The reference frequency generator is configured to calculate the reference frequency signal from the radio signal and generate the reference frequency signal. The information signal may include a synchronizing scheme that may enable at least one sub-system associated with the master device to synchronize to the information signal. In one embodiment, the information signal may include at least two portions. The first portion allows the information to periodically synchronize onto at least one data structure. The second portion of the information signal contains information related to the reference frequency signal, such as reference frequency error information. Hence, the information signal may include a periodic synchronization structure followed by one or more data structures that contain the reference frequency error information. In another embodiment, a flag structure is included between each data frame structure to prevent accidentally triggering synchronization. Additional details related to synchronizing the information signal with the sub-system is described below under Exemplary Devices and Methods. The information generator, in one embodiment, may be configured to calculate the reference frequency error information value and generate the reference frequency error information signal. The reference frequency error information value is calculated as the difference between the instantaneous value of the reference frequency signal and a "best knowledge and belief" value, which can be for example the long term average value of the reference frequency signal. The information generator is configured to store the instantaneous value of the reference frequency signal and to calculate the average value of the reference frequency signal. The reference frequency signal and the information signal are provided to at least one sub-system of the wireless communications device. Both signals may be provided to the sub-systems in a serial bus configuration; however, the invention is not limited to a serial bus configuration. The sub-system(s) of the wireless communication device may be a positioning system sub-system, that implements Global Positioning System (GPS)/Galileo technology or the like, a personal area network sub-system (e.g., Bluetooth®), or other suitable component of the wireless communication device. Further, the master device may use the positioning system sub-system to determine if the wireless device is moving. Therefore, the master device may assign a higher confidence to the instantaneous reference frequency signal due to absence of the Doppler Effect.

According to one implementation, a subsystem may include a decoder component and a signal processing component. The signal processing component in a sub-system may include a radio frequency (RF) transceiver component. The RF transceiver is configured to receive the reference frequency signal. The decoder component is configured to receive the information signal, which is generally useable to correct for errors that may be associated with the reference frequency signal. The decoder component may include a decoder and deframer that operate via an algorithm to generate a local error correcting signal based on the received information signal. The signal processing component may use this local error correcting signal and the reference frequency signal with a frac-N PLL to compensate for errors in the reference frequency signal or abrupt changes in the reference frequency signal by modifying the PLL division factors.

According to another implementation, a sub-system may include a decoder component and a signal processing component. The signal processing component may include a CORDIC component (Coordinate Rotation Digital Computer) in a baseband signal chain. The decoder component is configured to receive the information signal. The decoder component may include a decoder and deframer that operate via an algorithm to generate a local error correcting signal. This local error correcting signal and a baseband signal are provided to the CORDIC component. The CORDIC adjusts the baseband signal based on the local error correcting signal to account for reference frequency errors in the device.

A method to account for errors in reference frequency in a wireless communications device which may include calculating a reference frequency from a radio signal and generating a reference frequency signal in a reference frequency signal generator. The radio signal is also provided to the information generator. The information generator calculates a reference frequency error information value by assessing the difference between the instantaneous reference frequency signal and an assumed ideal reference frequency such as the long term average value of the reference frequency signal. The information signal is generated to reflect the difference between the instantaneous value and the assumed ideal value. The reference frequency signal and the information signal are transmitted to at least one sub-system. Both signals may be provided to multiple sub-systems via a serial bus or other suitable configuration. The information signal is received into a decoder component of the sub-system of a wireless communications device. The information signal may include a scheme that enables the at least one sub-system to synchronize to the information signal. In one embodiment a periodic synchronization data structure is followed by data frame structures containing reference frequency error information. The periodic synchronization data structure alerts the decoder component that information is coming and triggers a decoding algorithm. The decoding component reads the information in the recurring data frame structures. The information signal may be read with every rising and falling edge of the reference frequency signal, also known as Double Data Rate operation. However, Single Data Rate operation may also be used. Use of Single Data Rate would result in the information signal being read once per cycle of the reference frequency signal.

The techniques described herein may be implemented in a number of ways. The embodiments above and context provided below with reference to the included figures and ongoing discussion are not intended to limit the scope of the claims.

Exemplary Devices and Methods

FIG. 1 depicts a wireless communications network comprised of a base station 100 (which may be any suitable fixed or mobile transmitter or receiver), wireless communication signals 102, and a wireless communication device 104. The wireless communications device 104 has an antenna 106 to receive the wireless communication signals 102, which are directed to a master device 108 for processing. The master device 108 may be a cellular modem that contains, but is not limited to, an information generator 110 and a reference frequency generator 112. Other components of the wireless communications device 104 are well-known and may include, for example: one or more subsystems 114 (such as a positioning system circuit that implements Global Positioning System (GPS)/Galileo technology or the like, a personal area network circuit (e.g., Bluetooth®), other suitable components of the wireless communication device and user interaction components 116 (such as a speaker, microphone, display, keypad, and so forth).

Figure 2:
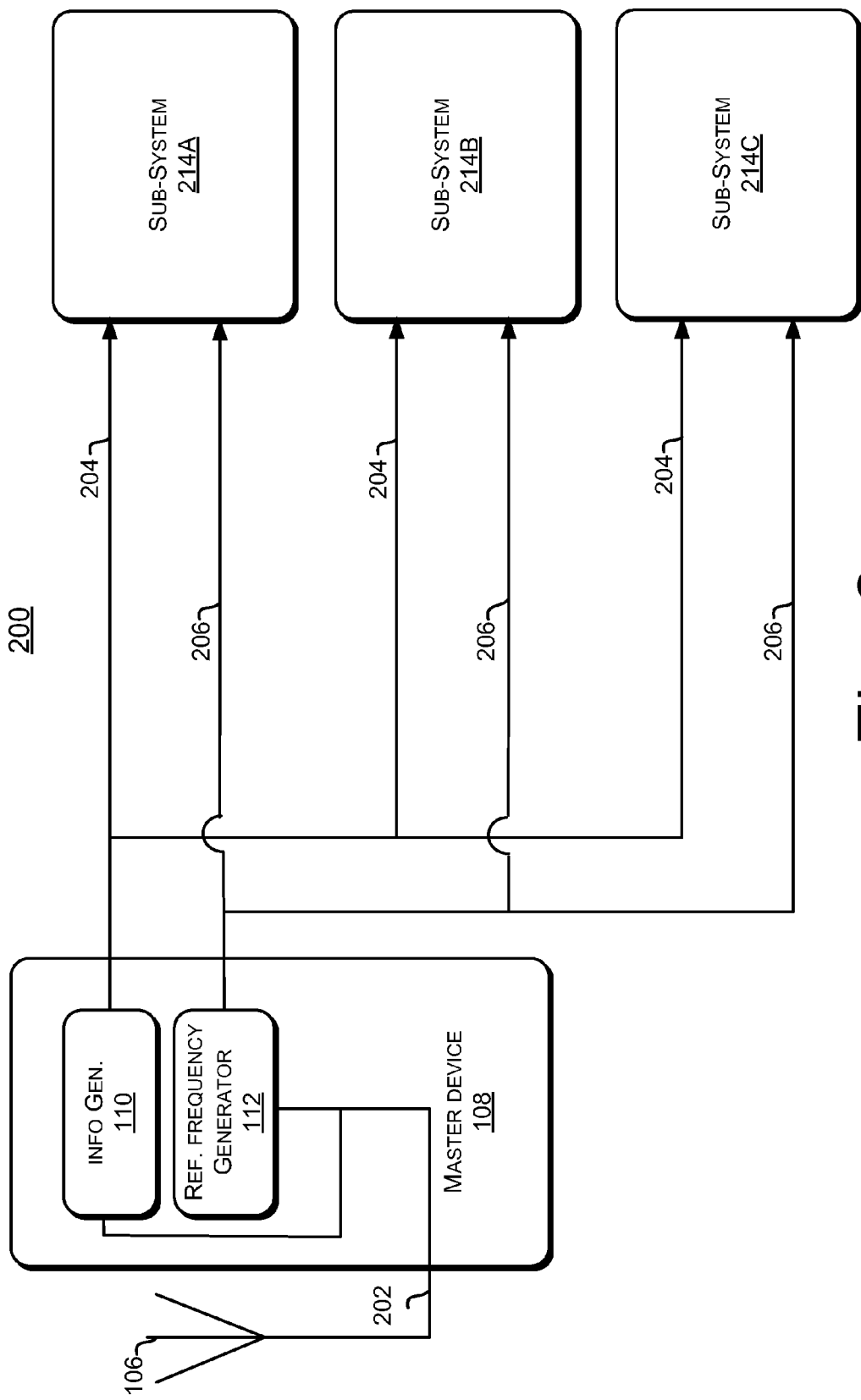
FIG. 2 is a schematic diagram of components located in a wireless communications device.

FIG. 2 depicts a schematic of some of the components of a wireless communications device 104 including a master device 108 and one or more sub-systems 214A, 214B, and 214C, which may correspond to sub-system 114 shown in FIG. 1. The master device 108 is coupled to the antenna 106 and receives the radio signal along path 202. The reference frequency signal is derived from the radio signal along path 202. The radio signal is provided to the information generator 110 and the reference frequency generator 112. The information generator 110, in one embodiment, determines the difference between the instantaneous reference frequency signal and an assumed ideal reference frequency signal, and generates the information signal to reflect that difference. The reference frequency signal is provided along path 206 and the information signal is provided along path 204. Both the reference frequency signal and the information signal are provided to sub-systems 214A-C. As mentioned above with regard to FIG. 1, the sub-systems 214A-C can be one or more positioning system circuit that implements Global Positioning System (GPS)/Galileo technology or the like, a personal area network circuit (e.g., Bluetooth®), or other suitable component of the wireless communication device.

According to one implementation, a wireless communications device has a master device, such as a cellular modem, that contains a baseband component and a Radio Frequency (RF) component. The baseband component generates the information value, for the information signal, and provides it to the information generator 110 in the RF component. The reference frequency generator 112, in the RF component, generates the reference frequency signal.

Figure 3:
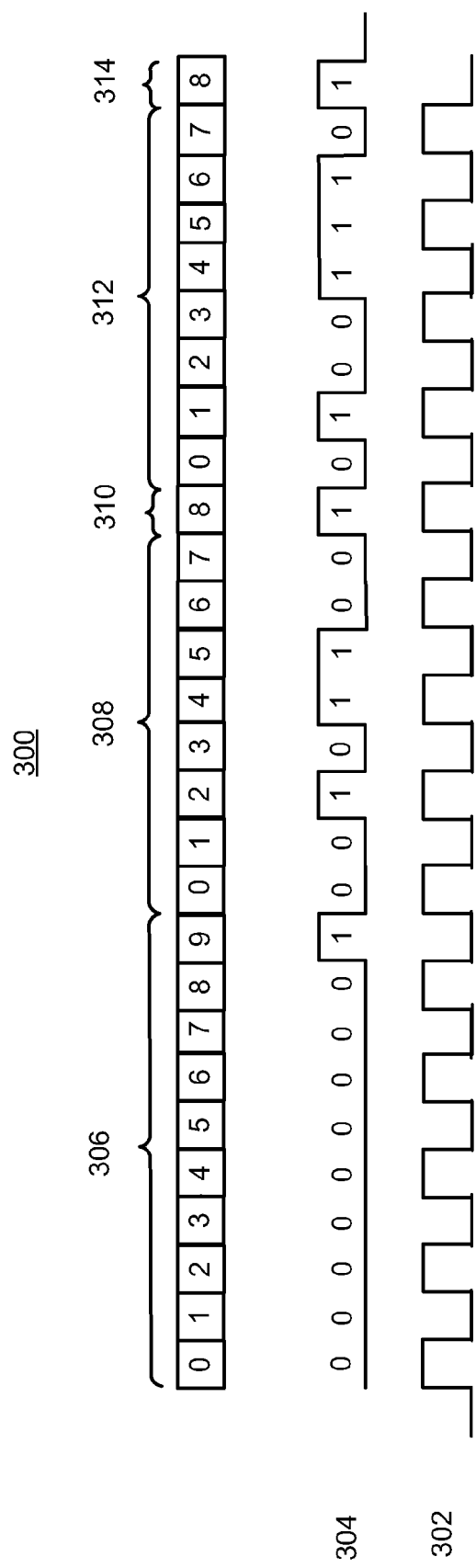
FIG. 3 is a timing diagram of the reference frequency signal and the information signal in a wireless communications device.

FIG. 3 depicts a timing diagram 300 that represents how a reference frequency signal 302 (such as that provided along path 206) and the information signal 304 (such as that provided along path 204) may be synchronized and the data decoded. In one embodiment, the information signal 304 is comprised of: a periodic synchronization pattern 306, a recurring data frame structure 308/312, and a flag structure 310/314 between each recurring data frame structure. The decoding algorithm is triggered in decoder/deframer upon the sub-system 214 receiving the periodic synchronization pattern. A person of ordinary skill in the art would realize the periodic synchronization structure, data structures and flag structures could be implemented in many different embodiments. The embodiment below is an example and is not intended to limit the invention to one embodiment. In this embodiment, the periodic synchronization pattern is shown as a 10-bit structure with nine bits at zero and the tenth bit at one. The number of bits and their orientation in the periodic synchronization pattern 306 can vary in order to trigger data decoding. Similarly, the recurring 8-bit data frame structure and the 1-bit flag structure can vary in size. In this embodiment, the 8-bit recurring data frame structures 308/312 contains error correction information that may be used to create a local error correcting signal. A 1-bit flag structure 310/314 separates each data frame structure. Using recurring 8-bit data frame structures separated by a 1-bit flag ensures the 10-bit periodic synchronization structure will never occur coincidentally. This system is designed so that the reference frequency information reaches the recipient of the clock signal immediately. In this embodiment, a Double Data Rate approach is shown, so that data is transmitted with every rising edge and every falling edge of the clock signal.

In another embodiment, a 1-data-bit to 2-code-bits transformation would enable at least one sub-system to synchronize to the information signal. For example, a data bit "0" would translate into code bits "00" and data bit "1" would translate into code bits "01" and the periodic synchronization structure would be "11." Whenever there are two or more "1"'s in the stream of transmitted bits, the following "0" would be the start of the data section.

Figure 4:
FIG. 4 is a flow diagram of a method for accounting for reference frequency errors in a wireless communications device.

FIG. 4 depicts a method for calculating a reference frequency signal and an information signal and providing both to at least one sub-system of a wireless communications device. Specifics of exemplary methods are described below. The process is illustrated as a collection of referenced acts arranged in a logical flow graph, which represent a sequence that can be implemented in hardware, software, or a combination thereof. The order in which the acts are described is not intended to be construed as a limitation, and any number of the described acts can be combined in any order and/or in parallel or omitted to implement the method 400.

At block 402, transmitting a reference frequency signal and an information signal from a master device to at least one sub-system. The master device 108 transmits the reference frequency signal 206 and the information signal 204 to the sub-system 214.

At block 404, reading an information signal in the sub-system. The sub-system 214A reads the information signal 304 with every rising edge and falling edge of the reference frequency signal 302.

Conclusion

The above described system and methods enable creating a system clock error correction signal for a wireless communications device from a variety of system clock error information. The system clock error correction signal may be transmitted to several sub-systems of the wireless device in an instantaneous manner. Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

The invention claimed is:

1. A wireless communication device comprising:
a master device configured to receive an input signal and to provide a reference frequency signal and an information signal, the information signal having a first portion that allows the information signal to periodically synchronize onto at least one data structure and a second portion that contains information related to the reference frequency signal.

2. The wireless communication device according to claim 1, wherein the second portion includes reference frequency signal error information.

3. The wireless communication device according to claim 1, wherein the information signal comprises a periodic synchronization data structure followed by one or more data frame structures with a flag structure between each data frame structure, the periodic synchronization data structure having a bit size at least one bit greater than the total number of bits of one recurring data frame structure and one flag structure.

4. The wireless communication device according to claim 1, further comprising a sub-system coupled to the master device, wherein the information signal is provided to the sub-system.

5. The wireless communication device according to claim 4, wherein each bit of the information signal is transmitted to the sub-system with every rising edge and every falling edge of the reference frequency signal.

6. The wireless communication device according to claim 4, wherein the sub-system is a positioning system sub-system or a personal area network sub-system.

7. The wireless communication device according to claim 1, wherein the master device comprises: a reference frequency generator configured to calculate the reference frequency signal from an input signal and generate the reference frequency signal, and an information generator configured to generate the information signal, the generated information signal including an information value, the information value being a difference between an instantaneous value of the reference frequency signal and an assumed ideal value of the reference frequency signal.

8. The wireless communication device according to claim 7, wherein the assumed ideal value is the long term average of the reference frequency signal received by the device.

9. The wireless communication device according to claim 7, further comprising a positioning system sub-system coupled to the master device, the master device capable of determining movement using the positioning system sub-system, and wherein the master device is to assign a higher confidence to the accuracy of the instantaneous reference frequency signal based on information obtained from the positioning system sub-system and transmit the level of confidence together with the information signal.

10. The wireless communication device according to claim 7, wherein: the information value for the information signal is generated in a baseband component of the device, the baseband component provides the information value to a radio frequency component of the device, the information generator is located in the radio frequency component of the device; and the radio frequency component is configured to provide the information signal to at least one sub-system of the device.

11. The wireless communication device according to claim 1, wherein the input signal is a radio signal and the reference frequency signal is a system clock signal.

12. The wireless communication device according to claim 1, wherein the information signal includes a coding scheme that enables at least one sub-system associated with the master device to synchronize to the information signal.

13. A method for transferring information comprising:
transmitting, from a master device to at least one sub-system, a reference frequency signal and an information signal, the information signal to provide information related to the reference frequency signal, the information signal having a first portion that allows the information signal to periodically synchronize onto at least one data structure and a second portion that contains information related to the reference frequency signal.

14. The method for transferring information as in claim 13, further comprising: reading, in the sub-system, the information signal with every rising edge and every falling edge of the reference frequency signal.

15. The method for transferring information as in claim 13, wherein the information signal comprises a periodic synchronization data structure followed by one or more data frame structures.

16. The method for transferring information according to claim 15, wherein the periodic synchronization data structure has a bit size at least one bit greater than the total number of bits of one data frame structure and one flag structure.

17. The method for transferring information according to claim 13, wherein the reference frequency signal is a system clock signal.

18. The method for transferring information according to claim 13, wherein the information signal includes a coding scheme that enables the at least one sub-system to synchronize to the information signal.

* * * * *